United States Patent [19]

Brettschneider et al.

[11] Patent Number: 4,478,613
[45] Date of Patent: Oct. 23, 1984

[54] APPARATUS TO REMOVE SOLID PARTICLES AND AEROSOLS FROM A GAS, ESPECIALLY FROM THE EXHAUST GAS OF AN INTERNAL COMBUSTION ENGINE

[75] Inventors: Johannes Brettschneider, Ludwigsburg; Klaus Dobler, Gerlingen; Gottlob Haag, Oberriexingen; Ernst Linder, Mühlacker; Wilhelm Polach, Möglingen, all of Fed. Rep. of Germany

[73] Assignee: Robert Bosch GmbH, Stuttgart, Fed. Rep. of Germany

[21] Appl. No.: 410,693

[22] Filed: Aug. 23, 1982

[30] Foreign Application Priority Data

Oct. 16, 1981 [DE] Fed. Rep. of Germany ....... 3141156

[51] Int. Cl.³ .............................................. B03C 3/14
[52] U.S. Cl. ...................................... 55/127; 55/152; 55/154; 55/DIG. 30; 60/275; 60/311
[58] Field of Search ................... 55/6, 124, 127, 152, 55/154, DIG. 30, DIG. 25; 60/274, 275, 311

[56] References Cited

U.S. PATENT DOCUMENTS

| | | | |
|---|---|---|---|
| 1,853,393 | 4/1932 | Anderson | 55/6 |
| 2,085,349 | 6/1937 | Wintermute | 55/6 |
| 2,368,828 | 2/1945 | Hanson et al. | 55/124 X |
| 2,667,942 | 2/1954 | Wintermute | 55/127 |
| 2,696,273 | 12/1954 | Wintermute | 55/127 |
| 2,785,769 | 3/1957 | Pollock | 55/6 |
| 3,110,580 | 11/1963 | Strubler | 55/123 X |
| 4,247,307 | 1/1981 | Chang | 55/152 X |
| 4,316,360 | 2/1982 | Liu et al. | 55/124 X |
| 4,352,681 | 10/1982 | Dietz | 55/127 |
| 4,380,900 | 4/1983 | Linder et al. | 55/127 X |

FOREIGN PATENT DOCUMENTS 714367 7/1965 Canada ................................. 55/127

Primary Examiner—Kathleen J. Prunner
Attorney, Agent, or Firm—Frishauf, Holtz, Goodman & Woodward

[57] ABSTRACT

To remove solid particles such as soot, aerosols, and the like, from the exhaust gas of an internal combustion (IC) engine, for example a Diesel engine, the solid particles and aerosols are first charged in an electrostatic field which is generated between a solid surface (2), preferably cylindrical, and pointed discharge elements, typically electrostatic spray disks (3). The solid particles will adhere together, and to the surface, to form—with respect to the original dust and soot particles and aerosols, large area flakes and agglomerates which are carried along by the gas flow, and are then separated out in a mechanical separator (7, 15, ).

2 Claims, 5 Drawing Figures ered, however, in mobile or vehicular applica-
APPARATUS TO REMOVE SOLID PARTICLES AND AEROSOLS FROM A GAS, ESPECIALLY FROM THE EXHAUST GAS OF AN INTERNAL COMBUSTION ENGINE The present invention relates to an apparatus to remove aerosols, soot, and other solid particles from a gas, and more especially from the exhaust gas from an internal combustion engine, especially from an exhaust gas from a Diesel engine.

BACKGROUND

It has previously been proposed to remove dust, soot, aerosols, and other solid particles from exhaust gases resulting from combustion processes, particularly systems using electrostatic precipitation. Thus, it is known to remove dust and solids from the smokestack gases of power plants by conducting the gases, including dust, through an electrostatic field which charges the dust electrically. On precipitation plates, which are electrical field plates, dust which is so charged, is collected. Filter portions on the precipitation surfaces, after some time, are exchanged, or the dust is mechanically removed, for example by a vibration or shaker system, for collection in a catch vessel or container.

Structures of this type have a substantial volume, and thus can be used, effectively, in stationary installations such as stationary power plants or the like. They cannot be employed, however, in mobile or vehicular application.

It has also been proposed—see German Patent Publication Document DE-OS No. 30 41 070—to remove solid particles from the exhaust gas of internal combustion (IC) engines by providing a suitable separating device which splits the main exhaust gas stream into two partial streams, in which one is enriched with solid particles, and the other one essentially cleaned or freed from solid particle presence. The separating device operates on the basis of a centrifugal or turbulence separator. At low flow or stream speed of the combustion exhaust gas, such mechanical separators do not sufficiently effectively remove soot and other solid particles from the exhaust gases.

THE INVENTION

It is an object to remove solid particles and aerosols from gases, especially from the exhaust gases emanating from an internal combustion engine, such as a Diesel engine, which can readily be applied to incorporation in an automotive or other vehicle utilizing such an engine; and which is simple and effective in use at all operating conditions of the engine.

Briefly, an electrostatic field is generated and, in accordance with the invention, a corona discharge is used to charge the solid particles and aerosols by exposing the gas to the corona discharge. A precipitating surface is provided on which the so charged particles will then precipitate and form flakes or agglomerates, from which they can be mechanically separated.

In accordance with a feature of the invention, the precipitating surface is formed as an electrode which is located, physically, opposite a second electrode which has projecting teeth or points to provide a corona discharge, the gas being conducted in the space between the disks, which may be called electrical spray or electrical charge spray disks. The precipitating surface can be formed, for example, in the form of a tube, from the surface of which the compacted, agglomerated solid particles can be removed, mechanically, by vibration, shaking, or the like, in the form of flakes or agglomerates.

The apparatus has the advantage that the combination of the electrostatic separation with the mechanical separation can reduce the overall structural volume to such an extent that the system can be combined with existing exhaust systems of automotive vehicles or the like. Soot and other solid carbon and contaminating particles are precipitated out at any speed of flow of the gas, even at very low speeds. Aerosols which are present in a gas likewise are precipitated since they will mix with soot and other solid components on the precipitating surface. Thus, and applied to the exhaust gases from the combustion process, and particularly from an internal combustion (IC) engine, blueish smoke, white smoke, as well as black or sooty exhaust smoke can be cleaned.

In accordance with a preferred feature of the invention, the corona discharge is obtained by using electrostatic spray fields disks which have sawtooth shaped projections or teeth; this arrangement increases the corona discharge, and hence the cleaning and precipitating effect.

DRAWINGS

Figure 1:
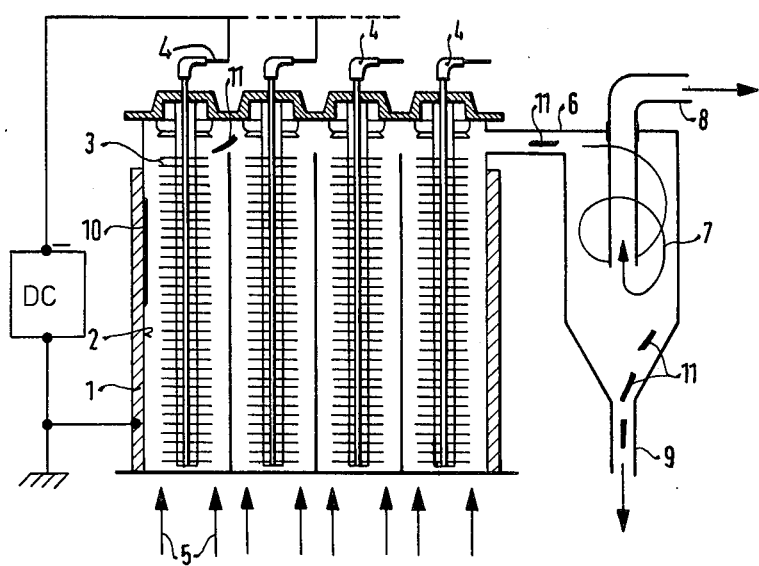
FIG. 1 is a vertical sectional schematic view through one embodiment of the invention.
Figure 2A:
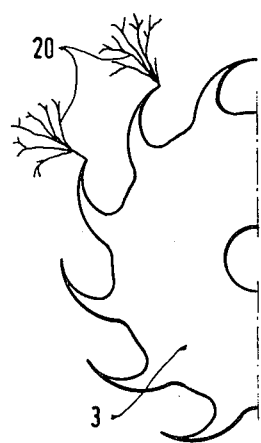
FIG. 2a shows half of a field spray disk.
Figure 2B:
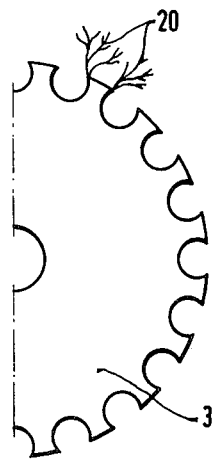
FIG. 2b shows half of another shape of field spray disk.
Figure 3:
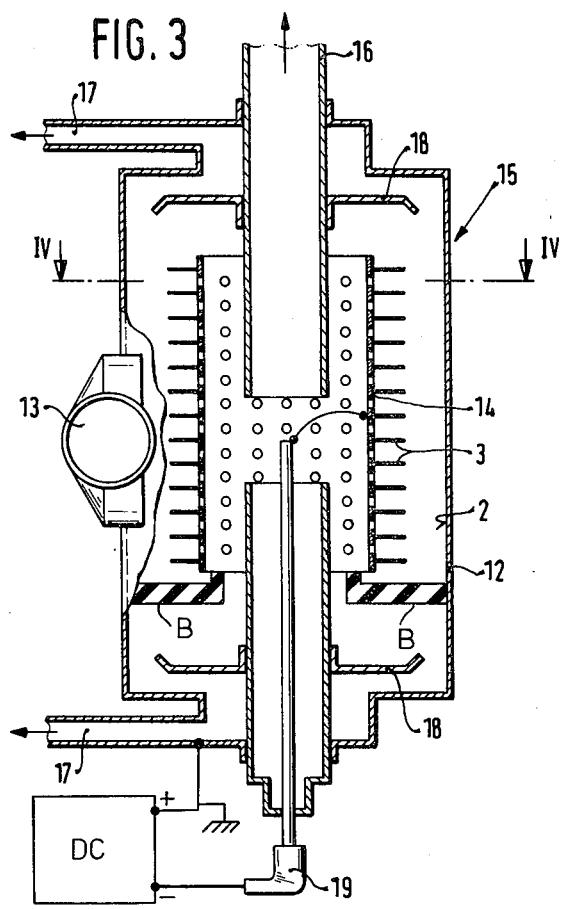
FIG. 3 is a vertical schematic view through the longitudinal axis of another embodiment of the invention.
Figure 4:
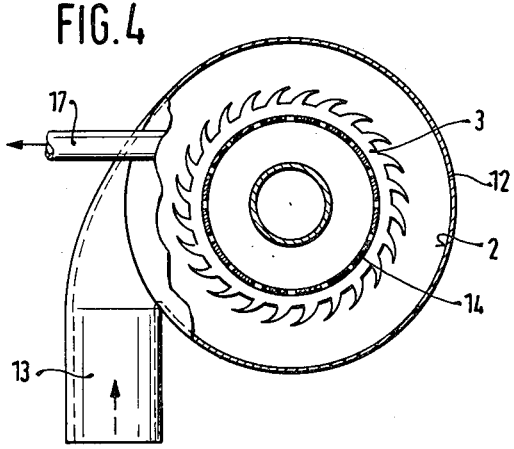
FIG. 4 is a sectional view through the structure of FIG. 3 along line IV—IV.

A plurality of tubular elements 1 forming closed tubular housing structures are combined in form of a parallel battery. Each tubular housing 1 is connected to the positive terminal of a direct current source DC; the housing 1 is grounded. The inner wall or inside surface of the housing 1 forms a precipitating surface 2. A stack of electrostatic field spraying disks 3 is located centrally within the housing 1, that is, concentrically with respect to the longitudinal axis thereof. The disks 3 are electrically connected over cables 4 with the negative terminal of the d-c source (DC). The disks 3 are formed with externally projecting points. In accordance with a preferred form, the disks 3 can be shaped in the form of circular saw blades, that is, have sawtooth-like projections formed thereon. Two examples of such disks 3 are shown, in top view, in FIGS. 2a and 2b. The corona discharge schematically shown at 20 which will emanate from the points of the blades 3 is likewise illustrated.

The exhaust gas to be cleaned is conducted along the arrows 5 within the ends of the tubular housing elements 1. The preferred entrance is at the lower side. The upper sides of the tubular elements 1 are connected to a manifold tube 6 which is connected to a mechanical separator 7. The mechanical separator 7 may be constructed, for example, as an impingement separator, or as a centrifugal separator. The mechanical separator 7 has a first exit pipe 8 for cleaned exhaust gas, and a second exit opening 9 exhaust gas which is enriched with solid particles, for example soot, carbon particles, and the like.

Operation: The gas to be cleaned is conducted in accordance with arrows 5 into the tubular elements 1 of the cleaning battery. The electrostatic field is generated between the precipitating surface 2 and the field spray disks 3. The plurality of the negatively charged disks 3 opposite the positive precipitating surface 2 generates a negative virtual field surface. The exhaust gas stream is carried between the exhaust gas surface 2 and the spray disks 3. The soot particles which are carried along are primarily charge negatively and thus will migrate to the positive precipitating surface 2, where they will lose their charge. Pulse ionization is particularly effective in charging the soot particles and aerosols. A visibly glowing skin will develop along the points of the spray disks 3, in the form of a corona, resulting in a corona discharge. The electrons which will leave the disks 3 are highly accelerated due to the particularly intense electric field thereat. The primary electrons, upon collision with neutral gas molecules, will form secondary electrons and secondary ions. A portion of the electrons which will result, by pulse ionization, will adhere to the soot components and aerosols, which are thereby charged negatively, and are thus caused to precipitate on the precipitating surface 2, and combine thereon to form agglomerates. The soot components and aerosols will form a layer of soot 10 on the surface 2, which layer will constantly increase and grow. At a predetermined thickness, which exceeds the roughness depth of the precipitating surface 2, or which can be determined by forming the internal surface in a grid structure or the like, the layer 10 will snap off in form of a plate or plate elements or flakes. Soot flakes 11 will be formed. The flaking-off of the layer 10 can be controlled by exposing the wall 1 to vibration, or by a compressed gas, for example compressed air jet, which is intermittently admitted. The flakes 11 will be carried along by the stream of gas and travel through the manifold 6 to the mechanical separator 7 where they are separated, as well known, from the gas. Cleaned exhaust gas can then be exhausted in the open atmosphere via the outlet 8, whereas the enriched exhaust gas, that is, the exhaust gas which is enriched with carbon particles and the like, can be recycled via an exhaust gas recirculation line to the IC engine for recombustion. Such exhaust gas recirculation lines (EGR lines) are standard, and are used and present in most modern IC engines to improve the exhaust gas quality. It is also possible, of course, to collect the solid particles 11 in a special collecting vessel or container.

The soot and carbon components within the exhaust gas primarily precipitate or deposit on the precipitation surface 2. It is also possible, however, that oppositely charged particles will deposit on the points of the spray disks 3. This must be prevented since, otherwise, the corona discharge may substantially weaken, and the precipitating rate of the electric filter will drop. To prevent such collection of particles at the points, the points are constructed, preferably, as shown in FIGS. 2*a* and 2*b* and, additionally, are mechanically subjected to shock or vibration, for example by vibration being transmitted from a vehicle, or by gas pulsation, or both, so that the points can vibrate themselves and oscillate, thus shaking off any deposits which might form thereon. To permit such vibration and movement of the points or ends of the teeth of the disks 3, they are preferably made very thin, for example of sheet metal of only 0.05 mm thickness, and clamped only at their center. Thus, the terminal ends of the disks can easily vibrate and flex.

Embodiment of FIGS. 3 and 4: The electrical filter and the mechanical separator can be integrated into one single structure. The mechanical separator is formed as a turbulence or centrifugal separating chamber. The separating chamber 15 is built of a cylindrical tube 12 in which the gas to be cleaned is supplied in tangential direction by a tangentially arranged supply line 13. An apertured sheet metal cylinder 14 is located coaxially within the cylindrical tube 12. The apertured hollow cylinder 14 carries a plurality of stacked electrostatic spray disks at the circumference. The facing end of the chamber 15 is connected to a coaxially extending tube 16, which extends towards the interior of the apertured cylinder 14.

The end faces of the cylinder 12 are formed with two respective outlets 17 for gases which are enriched with solid particles, for example flakes of soot or the like. A shield or diaphragm plate 18 is located spaced from the outlets 17 by some distance, to cover a portion of the end surfaces of the cylinder 12. The apertured cylinder 14 and the spray disks 3 secured thereto are connected to the negative terminal of the d-c source, DC, by a suitable supply cable 19. The cylindrical tube 12 is connected to the positive terminal of the d-c source. The apertured cylinder 14 and the spray disks thereon are held in position, as shown, for example by spiders or other holding brackets B which are made of insulating material, shown schematically only, and in accordance with any standard and suitable construction.

Operation, with reference to FIG. 4: The exhaust gases to be supplied to the separator are conducted into the separator over the tangential inlet 13. Similar to the arrangement of FIG. 1, soot components, aerosols, and the like, are charged by the electrostatic field existing between the inner surface of the cylindrical tube 12 and the points of the electrostatic spray disks 3. These particles will precipitate or collect in the form of sheets, flakes, agglomerates, and the like, on the inside surface of the cylindrical tube 12, which forms the precipitation surface 2. When the layer of soot and the like reaches a certain thickness, it will flake off, resulting in flakes of soot of substantial size. Centrifugal force is applied to these flakes due to the stream of gas which rotates about the central axis of a turbulence chamber 15. At first, the flakes are driven along the wall of the cylindrical tube 12, and from then on are driven along a boundary layer which follows a secondary stream along the wall. The major portion of the soot flakes, agglomerates, and the like, will drop between the shields 18 and the cylindrical tube 12 to be guided to the exhaust or outlet conduits 17. The remaining portion will be conducted along the shields 18 towards the center. The cleaned exhaust gas can escape over the pipe 16 into the atmosphere, or can be removed otherwise.

An electrical wind will result due to the corona discharge which assists the centrifugal force and the formation of the secondary stream. The outlets 17 for the gas, which is enriched with soot, carbon particles, and the like, can be connected to an EGR line, as described in connection with line 9, FIG. 1.

Various changes and modifications may be made, and features described in connection with any one of the embodiments may be used with any of the others, within the scope of the inventive concept.

We claim:

1. Apparatus to remove solid particles and aerosols from a gas, especially from the exhaust gas of an internal combustion engine,
comprising
a closed housing structure;
electrodes formed with projecting points or teeth located within said closed housing structure, the teeth facing an inside surface of said housing structure;
electrical charge means having one terminal connected to said closed housing structure, and another terminal to said electrodes;
combustion exhaust gas conducting means (13) conducting exhaust gas including the particles and aerosols into the closed housing structure and in a space between the inside surface of the closed housing structure and said teeth, the inside surface of the closed housing structure forming a precipitating surface for collection of solid particles and aerosols in the form of flakes and agglomerates thereon;
a mechanical separator (15) further connected to said space within the closed housing structure to receive exhaust gas and flakes and agglomerates carried along therewith;
and two outlet means (16, 17) from said mechanical separator, one (16) of said outlet means carrying gas essentially free from solid particles, flakes and agglomerates, and the other of said outlet means (17) carrying gas essentially free from solid particles and aerosols but enriched with said flakes and agglomerates,
wherein the mechanical separator (15) and the closed housing structure comprise a single element forming a centrifugal or turbulence chamber (15) of generally circular cross section having an inside surface and two end portions;
the combustion exhaust gas conduction means (13) comprises an inlet to said chamber (15) supplying gas in a tangential direction for travel within said chamber in a circular and axial or spiral path;
the electrodes comprise an apertured cylinder (14) located within the chamber, and at least one electrostatic field spray disk (3) having said projecting points or teeth formed thereon located circumferentially on said cylinder, to build up an electrostatic field between the apertured cylinder (14) and the inside surface of the chamber (15);
said one of said outlet means (16) comprises a tubular duct extending within the apertured cylinder, and terminating within the longitudinal dimension thereof;
and the other outlet means (17) comprises at least one outlet duct (17) located adjacent at least one of the end portions of the chamber;
and the mechanical separator comprises the combination of the tangential location of said gas conduction means (13) and a shield or cover plate (18) spaced from said other outlet means and the inside surface of said chamber to permit conduction of flakes or agglomerates by gas to said other outlet means traveling in a spiral path around the inside surface of the chamber at which the flakes and agglomerates will precipitate, while permitting exhaust of gas from a position within said apertured cylinder through said one outlet means (16).

2. Apparatus according to claim 1, wherein the electrodes comprise a plurality of electrode spray disks located, axially stacked, on said apertured cylinder (14).

* * * * *